July 23, 1968  H. LAUSE  3,393,953

PRISM TELESCOPE

Filed Sept. 17, 1965  2 Sheets-Sheet 1

INVENTOR:
Helmut Lause
BY Singer, Stern &
Carlburg, Attorneys.

July 23, 1968  H. LAUSE  3,393,953
PRISM TELESCOPE
Filed Sept. 17, 1965  2 Sheets-Sheet 2

Inventor:
Helmut Lause,
by Singer, Stern &
Carlburg, Attorneys.

United States Patent Office 3,393,953
Patented July 23, 1968

3,393,953
PRISM TELESCOPE
Helmut Lause, Oberkochen, Wurttemberg, Germany, assignor to Carl Zeiss-Stiftung, doing business as Carl Zeiss, Heidenheim on the Brenz, Wurttemberg, Germany, a corporation of Germany
Filed Sept. 17, 1965, Ser. No. 487,979
Claims priority, application Germany, Sept. 26, 1964,
Z 11,094
7 Claims. (Cl. 350—47)

ABSTRACT OF THE DISCLOSURE

A prism telescope which may also be used in duplicate as a double prism telescope and which is provided between its ocular and objective with two prisms, one of which is stationary, while the other one for focusing is adjustable and is mounted on a prism carrier slidably adjustably mounted on a guide post. The improvement comprises that the adjustment of the prism carrier takes place by hydraulic transmission means arranged between the customary rotatable adjusting knob and the prism corner. The adjusting knob displaces a piston in a hydraulic cylinder which is connected by a closed hydraulic circuit with a hydraulic cylinder on the guide post for acting on a piston which displaces the prism carrier and therewith the prism mounted on the same.

This invention relates to a prism telescope having collecting oculars and slidably arranged prisms.

In contrast to presently known telescopes of this kind in which adjusting and focusing is effected by purely mechanical means, the telescope of the present invention is provided with hydraulic adjustment elements for transmission of the focusing movement to the adjustable prisms.

The arrangement according to the present invention has the advantage that the prisms, which are very sensitive to rocking effects, can here be mounted very precisely slidably without having to resort to complicated mechanisms. Another advantage is that with the arrangement herein disclosed, the actuating elements, projecting through the housing of the instrument, can be completely sealed.

The details of the invention will now be described with reference to the accompanying drawings in which preferred embodiments are shown:

Figure 1:
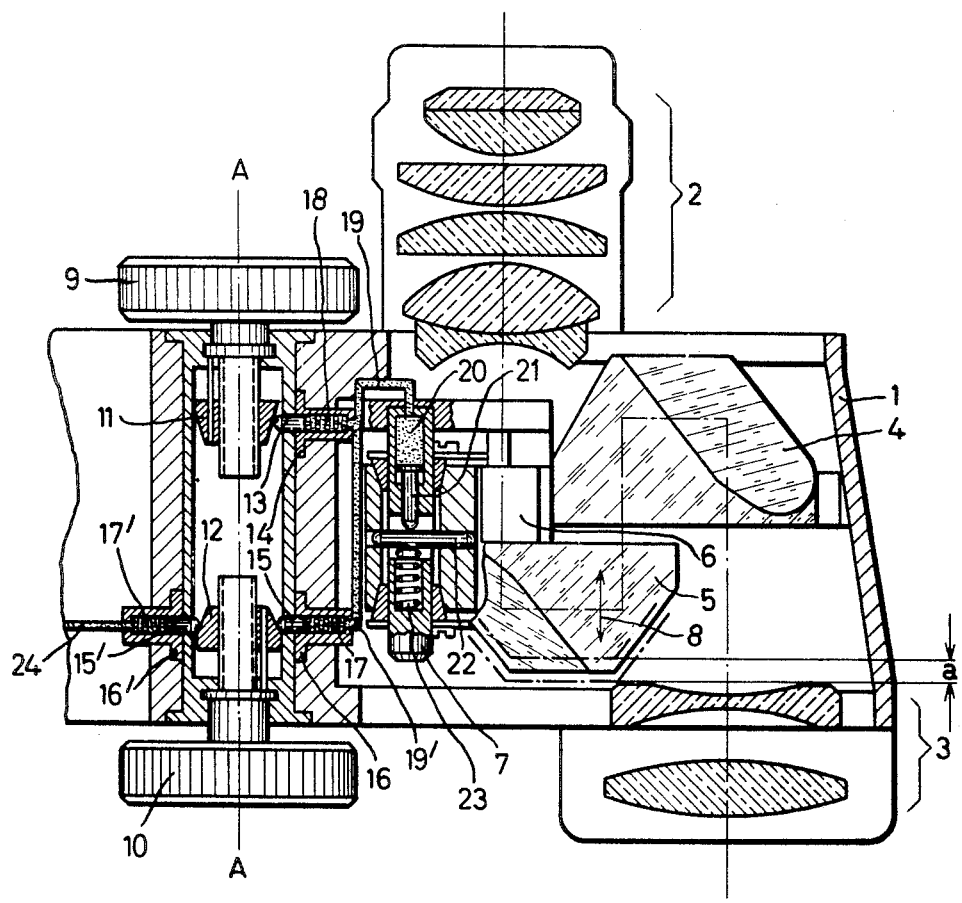
FIG. 1 is a sectional side view of the right half of a binocular telescope incorporating one form of the focusing device according to the invention.

Only one half of a binocular telescope is shown in FIG. 1 because the construction of the other half is identical to the first one. Within the housing 1 there are arranged, in addition the optical system of ocular 2 and objective 3, two Porro prisms of which one prism 4 is fixedly secured in the housing and the other prism 5 is attached to a slidable prism carrier 6. The prism carrier 6 is mounted for slidable movement along a guide post 7 arranged parallel to the optical axis of the objective 3, which arrangement permits movement of prism 5 in the directions of double arrow 8. Focusing of the telescope half shown in the drawing is achieved by a slidable adjustment of the prism 5 relatively to the prism 4. The distance of such movement is indicated by letter a.

The focusing movement is effected by two axially alined knurled screw spindles 9 and 10, on the threaded portion of which travel conical nuts 11 and 12 along the axis A—A when the screw spindles are rotated. Against the conical wall surface of the nut 11 there is urged one end of a piston 13 operating in a pressure cylinder 14; and against the conical wall surface of the nut 12 are urged one end of the pistons 15 and 15' operating in pressure cylinders 16 and 16' respectively. The pistons are urged against the nuts 11 and 12 by springs 17, 17' and 18 located in the corresponding cylinders. Furthermore, a pressure liquid, for example hydraulic oil, is contained in the cylinders 14 and 16, which are in communication with a pressure cylinder 20 arranged on the guide post 7 by conduits 19 and 19'. Pressure exerted on a piston 21, sliding in the pressure cylinder 20, results in movement of this piston downward and causes similar movement of prism carrier 6 and prism 5 attached thereto by way of pin 22 secured to the prism carrier 6 extending transversely into the cylinder 20 to be engaged by one end of the piston 21. A compression spring 23 located in guide post 7 effects counter or upward movement of the prism carrier 6. The pressure liquid contained in pressure cylinder 16' is in communication with a completely similar transmission system for operating the prism carrier in the other half of the binocular (not shown) by a conduit 24. Thus, by manipulating the knurled screw spindle 10, both prism carriers are moved simultaneously and in the same direction resulting in over-all focusing. Since the knurled screw spindle 9, on the other hand, is in operative connection with only the prism carrier in the right half of the binocular, the spindle 9 can be used for single focusing, that is, for instance, to correct a spherical defect in the vision of the observer.

Figure 2:
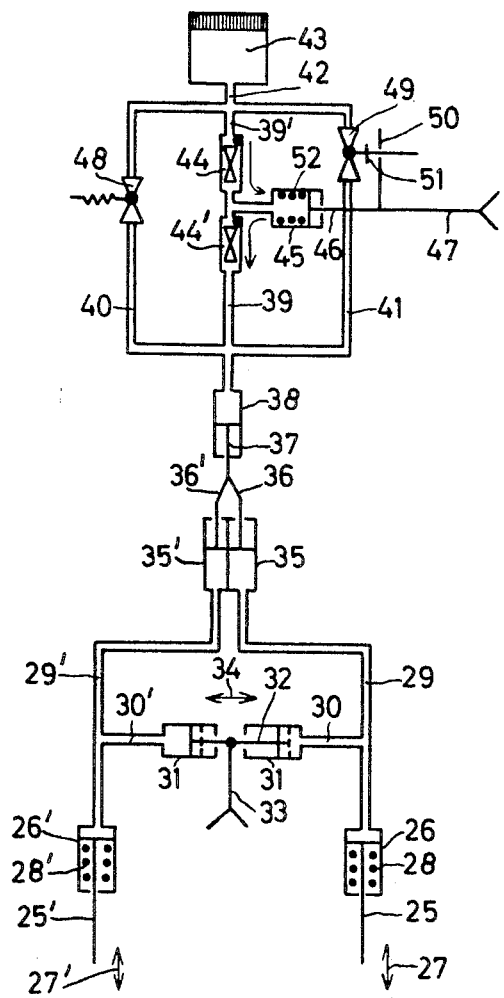
FIG. 2 is a diagrammatic illustration of another form of the invention having completely hydraulic focusing means.

FIG. 2 illustrates diagrammatically another example of a hydraulic focusing device in accordance with this invention, but here completely separated from the optical reproduction system in which it is to be employed. This device, similar to the one described with reference to FIG. 1, is capable of over-all focusing of two optical systems and permits also a relative adjustment between the same. The optical elements for internal focusing, such as, for instance, the prism carriers of a binocular telescope as shown in FIG. 1, are operatively connected with the pistons 25 and 25' located in the pressure cylinders 26 and 26' respectively, to effect their movement in the directions of the double arrows 27 and 27'. Return movement of the pistons is effected by compression springs 28 and 28' positioned within the cylinders. The conduits 29 and 29', filled with pressure liquid, are in communication with a difference cylinder by branches 30 and 30'. The piston 32 in cylinder 31 can be adjusted in the directions of the double arrow 34 by an actuator 33. Such an adjustment, for instance, a movement of the piston into the position indicated by dotted lines, results in increasing the pressure in line 29 for the same value as it is decreased in line 29'. In its center position, the piston in the difference cylinder is in equilibrium, while in all other positions it is mechanically braked in a known manner.

The conduits 29 and 29' lead further more to separate pressure cylinders 35 and 35' whose pistons 36 and 36' are rigidly connected with the piston 37 in a further pressure cylinder 38. One end of this pressure cylinder 38 is in communication with reservoir 43 of pressure liquid by means of parallel conduits 39, 39', 40 and 41 and a common conduit 42. The check valves 44 and 44', which allow liquid flow only in the directions indicated by arrows, are inserted in the conduit 39 and 39' respectively. The check valves 44 and 44' form together with a pressure cylinder 45, whose piston 46, for example, is provided with a push button 47, a pumping system by means of which liquid from the reservoir 43 may be pumped into pressure cylinder 38.

A spring-loaded pressure-relief valve 48 is inserted in line 40 to protect the conduit system against excessive stresses. A liquid-return valve 49 is inserted in conduit 41 and is opened by an extension 50 projecting laterally from the rod of the push button 47 when this push button is completely pressed down so that extension 50 acts against a shoulder 51 on the valve 49. Return movement of piston 46 and of its push button is effected by compression spring 52 in cylinder 45.

An adjustment of all of the optical elements connected with the pistons 25 and 25' in a downward direction is accomplished by an action pumping performed by the push button 47, whereby, however, this button must not be completely depressed. Adjustment in upward direction (toward upper points of arrows 27, 27') is obtained by completely depressing push button 47, whereby as described above, the liquid-return valve 49 is opened and the compression springs 28 and 28' overcome the thereby reduced liquid pressure in the cylinders and move the corresponding pistons 25 and 25' upwardly.

A different adjustment of the pistons 25 and 25' in conjunction with the optical elements connected thereto, i.e. single focusing, is effected by a displacement of the piston 32 by means of actuator 33.

The invention is by no means restricted to the disclosed embodiments which concern a hydraulic focusing device, but allows for various modifications. Moreover, the application of the hydraulic focusing device of this invention is not limited to binocular telescopes, but can be advantageously employed, wherever it is desirable to obtain in optical reproduction systems a focusing movement that is free of backlash.

What I claim is:

1. The combination of a prism telescope having a housing which includes a collective ocular, an objective mounted therein, two spaced prisms located between said ocular and said objective, means attached to said housing for adjusting one of said prisms relatively to the other, said adjusting means including a fixedly mounted guide post connected to said housing, a prism carrier on which said adjustable prism is fixedly mounted slidably attached to said guide post, means forming a closed hydraulic path (19), a first hydraulic cylinder in said hydraulic path and attached to said guide post, a first piston slidable in said cylinder, means for operatively connecting said piston with said prism carrier to move the latter when said piston is moved, manually operable means on said housing and engaging a second piston (13) in a second hydraulic cylinder connected with said closed hydraulic path, said second piston being displaced by said manually operable means which hydraulically transmits movement to said first movable piston operatively connected to said prism carrier.

2. The combination of a prism telescope according to claim 1, including a second collective ocular, a second objective mounted on said housing, a second set of two spaced prisms located between said second ocular and second objective, a second adjusting means attached to said housing for one of the two prisms of said second set, said second adjusting means including a second fixedly mounted guide post connected to said housing, a second prism carrier on which the adjustable prism of said second set of prisms is fixedly mounted, said second prism carrier being slidably mounted on said second guide post, means forming a second closed hydraulic path (24), a third hydraulic cylinder in said second hydraulic path and arranged on said second guide post, a third piston slidable in said third cylinder, means operatively connecting said third piston with said second prism carrier, a second manually operable means (10) on said housing and engaging a fourth piston (15') in a fourth hydraulic cylinder (16') connected with said second closed hydraulic path, and a fifth slidable piston (15) in a fifth hydraulic cylinder (16) connected with said first hydraulic path (19), said fourth and fifth slidable pistons being engaged by said second manually operable means for hydraulically transmitting movements to said third movable piston which is operatively connected with said second prism carrier and to said first movable piston (21) which is operatively connected with said first prism carrier.

3. A prism telescope according to claim 1, in which said manually operable means comprises a rotatable threaded spindle, a conical nut on said spindle for axial displacement of said nut when said threaded spindle is manually rotated, said conical nut with its conical surface engaging said second piston in said second hydraulic cylinder.

4. A prism telescope according to claim 2, including a different cylinder including a slidable piston therein connected with both said hydraulic movement transmission means, a pumping system connected with said different cylinder, and an additional actuating member for permitting a simultaneous adjustment of both slidable prisms together with the operation of said pumping system, said additional actuating members comprising a push button.

5. A prism telescope according to claim 2, including a different cylinder including a slidable piston therein connected with both said hydraulic movement transmission means, a pumping system connected with said different cylinder, an additional actuating member for permitting a simultaneous adjustment of both slidable prisms together with the operation of said pumping system, and pressure relief valve means arranged in operative connection with said pumping system.

6. A prism telescope according to claim 2, including a different cylinder including a slidable piston therein connected with both said hydraulic movement transmission means, a pumping system connected with said different cylinder, and an additional actuating member for permitting a simultaneous adjustment of both slidable prisms together with the operation of said pumping system, said additional actuating members comprising a push button provided with a lateral projection, which upon a complete depression of the push button opens a return flow valve in the associated hydraulic conduit.

7. A prism telescope according to claim 1, including springs in both of said hydraulic cylinders for acting on said pistons in opposite direction to the displacement of said pistons caused by the action of said manually operable means and transmitted by said hydraulic path.

References Cited

UNITED STATES PATENTS

| 788,823 | 5/1905 | Dieckmann | 350—36 |
| 2,811,895 | 11/1957 | Jensen | 350—36 X |

FOREIGN PATENTS

| 1,316,033 | 12/1963 | France. |

DAVID SCHONBERG, *Primary Examiner.*

P. R. GILLIAM, *Assistant Examiner.*